(12) United States Patent
Huang et al.

(10) Patent No.: US 11,334,967 B2
(45) Date of Patent: May 17, 2022

(54) METHOD AND IMAGE PROCESSING DEVICE FOR GENERATING IMAGE FILTER

(71) Applicant: Novatek Microelectronics Corp., Hsinchu (TW)

(72) Inventors: Xin Huang, Xi'an (CN); Fan Wang, Xi'an (CN); Xi Tian, Xi'an (CN)

(73) Assignee: Novatek Microelectronics Corp., Hsinchu (TW)

( * ) Notice: Subject to any disclaimer, the term of this patent is extended or adjusted under 35 U.S.C. 154(b) by 15 days.

(21) Appl. No.: 16/944,097

(22) Filed: Jul. 30, 2020

(65) Prior Publication Data

US 2022/0036510 A1    Feb. 3, 2022

(51) Int. Cl.
*G06T 5/00* (2006.01)
*G06T 5/50* (2006.01)
*G06N 3/08* (2006.01)
*G06T 3/40* (2006.01)

(52) U.S. Cl.
CPC .............. *G06T 5/001* (2013.01); *G06N 3/08* (2013.01); *G06T 3/4046* (2013.01); *G06T 5/50* (2013.01); *G06T 2207/10024* (2013.01); *G06T 2207/20024* (2013.01); *G06T 2207/20081* (2013.01); *G06T 2207/20084* (2013.01)

(58) Field of Classification Search
CPC ......... G06T 3/4046; G06T 5/00; G06T 5/001; G06T 5/009; G06T 5/50; G06T 2207/10024; G06T 2207/20024; G06T 2207/20028; G06T 2207/20081; G06T 2207/20084

USPC .......................... 382/100, 260–265, 155–159
See application file for complete search history.

(56) References Cited

U.S. PATENT DOCUMENTS

| | | | |
|---|---|---|---|
| 10,872,292 B1* | 12/2020 | Yang | G06N 3/04 |
| 2017/0053398 A1* | 2/2017 | Mahoor | G06K 9/6269 |
| 2018/0285679 A1* | 10/2018 | Amitay | G06K 9/4642 |
| 2019/0230354 A1* | 7/2019 | Kim | H04N 19/124 |
| 2019/0328460 A1* | 10/2019 | Ronen | A61B 34/20 |

FOREIGN PATENT DOCUMENTS

JP      06231245 A   *  8/1994   ........... G06K 9/4619

OTHER PUBLICATIONS

Olaf Ronneberger et al., "U-Net: Convolutional Networks for Biomedical Image Segmentation." arXiv:1505.04597v1 [cs.CV], May 18, 2015, pp. 1-8.

Yuanying Dai et al., "A Convolutional Neural Network Approach for Post-Processing in HEVC Intra Coding." arXiv:1608.06690v2 [cs.MM], Oct. 29, 2016, pp. 1-12.

* cited by examiner

*Primary Examiner* — Andrew M Moyer
*Assistant Examiner* — Stephen M Brinich
(74) *Attorney, Agent, or Firm* — JCIPRNET

(57) ABSTRACT

A method and an image processing device for generating an image filter are proposed. The method includes the following steps. A first image is received and inputted into a pre-trained convolutional neural network (CNN) model, and the image filter corresponding to the first image is obtained based on an output result of the pre-trained CNN model.

16 Claims, 8 Drawing Sheets

METHOD AND IMAGE PROCESSING DEVICE FOR GENERATING IMAGE FILTER

TECHNICAL FIELD

The disclosure relates to a method and an image processing device for generating an image filter.

BACKGROUND

In-loop filters constitute an important part of the latest video coding standards. For example, HEVC in-loop filtering involves deblocking (DB) filtering and sample adaptive offset (SAO) filtering, and AVS2 in-loop filtering involves adaptive loop filtering. These in-look filters are configured to suppress various noises produced during video coding such as blocking artifacts and ring artifacts for improvement. However, there exists a trade-off between noise suppression and detail preservation.

SUMMARY OF THE DISCLOSURE

A method and an image processing device for generating an image filter are proposed.

According to one of the exemplary embodiments, the method includes the following steps. A first image is received and inputted into a pre-trained convolutional neural network (CNN) model, and the image filter corresponding to the first image is obtained based on an output result of the pre-trained CNN model.

According to one of the exemplary embodiments, the image processing device includes a memory circuit and a processing circuit. The memory circuit is configured to store data. The processing circuit is configured to receive a first image, input the first image into a pre-trained CNN model, and obtain an image filter corresponding to the first image based on an output result of the pre-trained CNN model.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

To make the above features and advantages of the application more comprehensible, several embodiments accompanied with drawings are described in detail as follows.

DESCRIPTION OF THE EMBODIMENTS

Figure 1A:
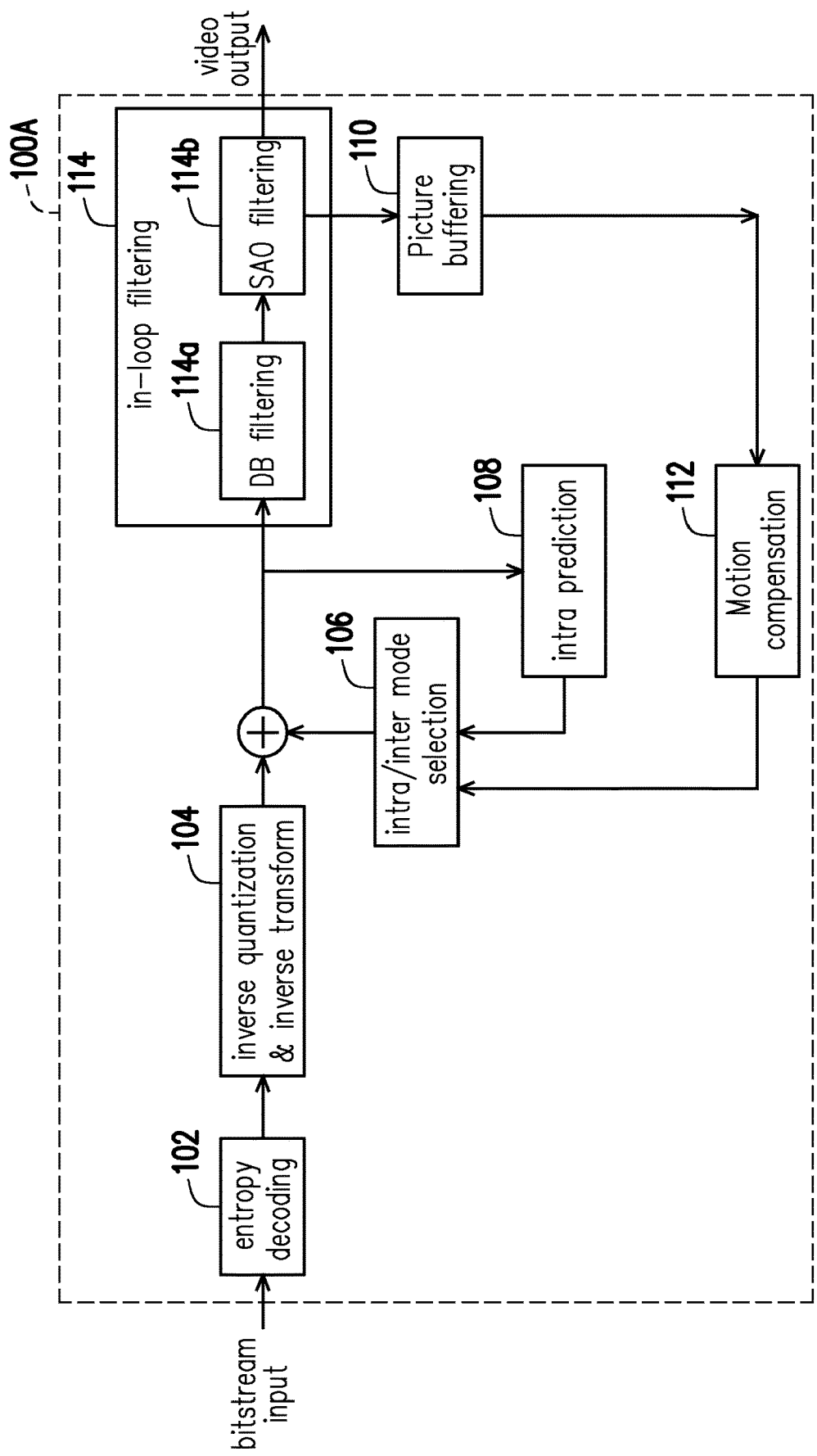
FIG. 1A illustrates a conventional video decoding scheme with an in-loop filter.

FIG. 1A illustrates a conventional video decoding scheme with an in-loop filter. A conventional decoder 100A in FIG. 1A is configured to reconstruct a received bitstream input for video output and includes an entropy decoding unit 102, an inverse quantization and inverse transform unit 104, an intra/inter mode selection 106, an intra prediction section 108, a picture buffering section 110, a motion compensation section 112, and an in-loop filter 114 having a DB filtering unit 114a and a SAO filtering unit 114b.

As neural network techniques have been used by the engineering community in a variety of applications, convolutional neural networks (CNN) have been introduced into video coding procedures to replace the DB filtering unit 114a and the SAO filtering unit 114b in the in-loop filter 114 and resulted in more than 5% of improvements in coding efficiency.

Figure 1B:
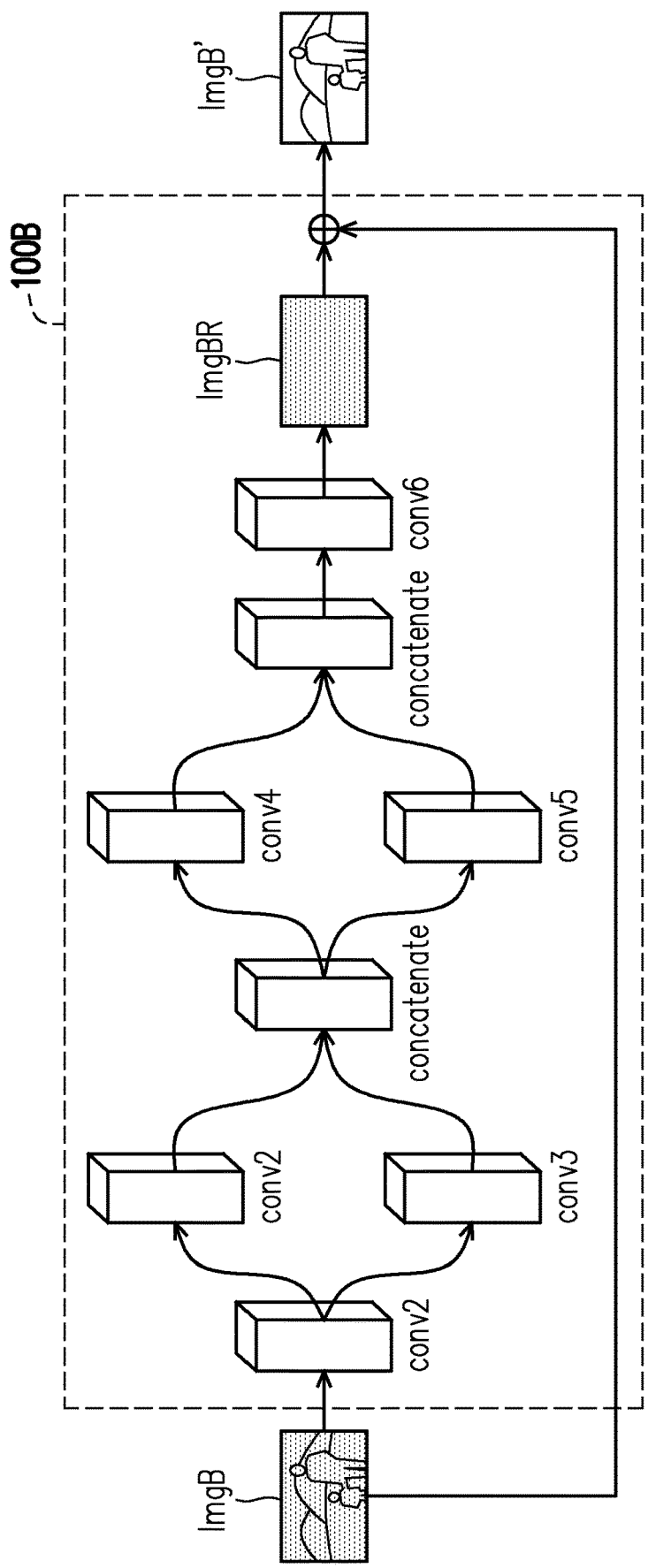
FIG. 1B illustrates a schematic diagram of a variable-filter-size residue-learning convolutional neural network (VRCNN) scheme designed for a conventional in-loop filter.

For example, FIG. 1B illustrates a schematic diagram of a VRCNN scheme designed for a conventional in-loop filter. A VRCNN 100B in FIG. 1B is a 4-layer convolutional network, where its characteristics are listed in Table 1. The input of the VRCNN 100B is an input image ImgB, and the output ImgB' of the VRCNN 100B is the addition of the input image ImgB and a residual image ImgBR based on residual learning. In the VRCNN 100B, there are kernels of different sizes in Layer 2 and Layer 3 (i.e. conv2, conv3, conv4, and conv5) to suppress blocking artifacts caused by different sizes of coding units in HEVC. However, the size differences also cause the VRCNN 100B to perform slowly for parallel computing.

TABLE 1

| layer No. | Layer 1 | Layer 2 | Layer 3 | Layer 3 | Layer 4 | |
|---|---|---|---|---|---|---|
| size of kernel | 5 × 5 | 5 × 5 | 3 × 3 | 3 × 3 | 1 × 1 | 3 × 3 |
| number of kernel | 64 | 16 | 32 | 16 | 32 | 1 |
| number of parameters | 1600 | 25600 | 18432 | 6912 | 1536 | 432 |
| total number of parameters | | | 54512 | | | |

Figure 1C:
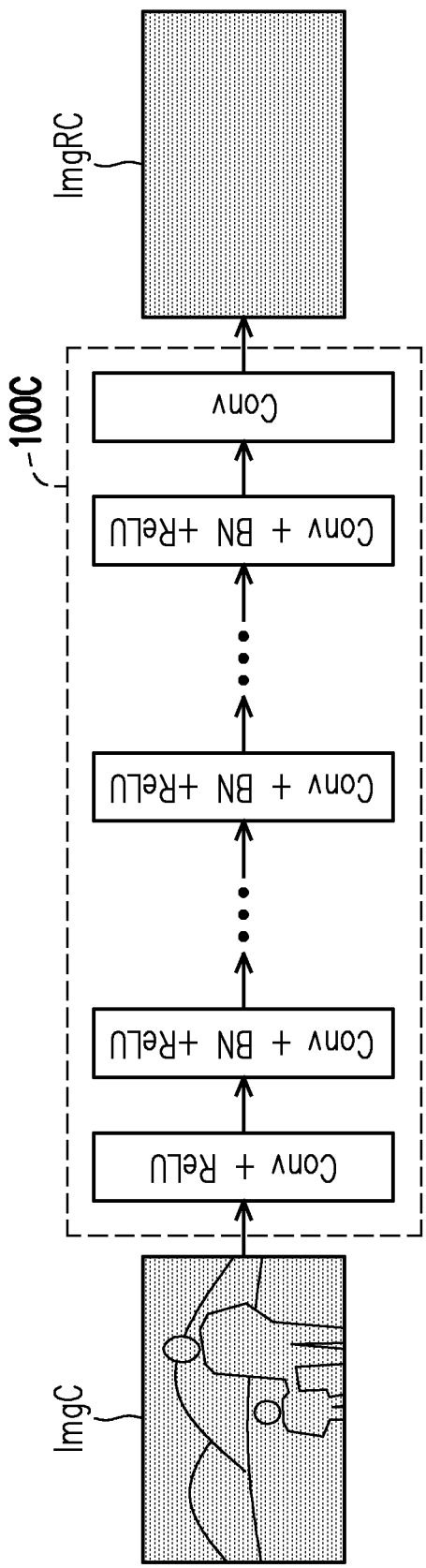
FIG. 1C illustrates a schematic diagram of a denoising convolutional neural network (DnCNN) scheme designed for a conventional in-loop filter.

As another example, FIG. 1C illustrates a schematic diagram of a DnCNN scheme designed for a conventional in-loop filter. A DNCNN 100C in FIG. 1C is a 17-layer convolutional network, where its characteristics are listed in Table 2. The input of the DnCNN 100C is a noisy image ImgC, and the output of the DnCNN 100 C is a residual image ImgCR based on residual learning. In the DnCNN 100C, there are three types of layers incorporated by convolution, rectified linear unit (ReLU), and batch normalization (BN): Conv+ReLU for Layer 1, Conv+BN+ReLU for Layer 2 to Layer 16, and Cony for Layer 17.

TABLE 2

| layer No. | Layer 1 | Layers 2-16 | Layer 17 |
|---|---|---|---|
| size of kernel | 3 × 3 | 3 × 3 | 3 × 3 |
| number of kernel | 64 | 64 | 64 |
| number of parameters | 576 | 36992 | 576 |
| total number of parameters | | 556032 | |

Figure 1D:
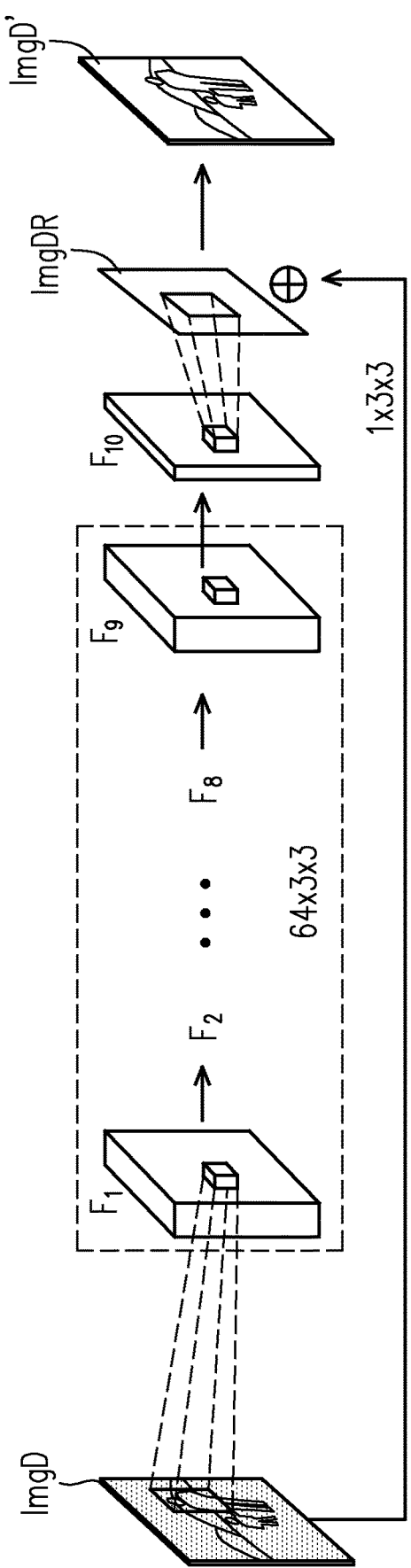
FIG. 1D illustrates a schematic diagram of a deep CNN-based auto decoder (DCAD) network scheme designed for a conventional in-loop filter.

As another example, FIG. 1D illustrates a schematic diagram of a DCAD network scheme designed for a conventional in-loop filter. A DCAD network 100D in FIG. 1D is a 10-layer convolutional network, where its characteristics are listed in Table 3. The input of the DCAD network 100D is an input image ImgD, and the output ImgD' of the DCAD network 100D is the addition of the input image ImgD and a residual image ImgDR based on residual learning. In the DCAD network 100D, a stack of 3×3 convolutional kernels are used.

TABLE 3

| layer No. | Layer 1 | Layers 2-9 | Layer 10 |
|---|---|---|---|
| size of kernel | 3 × 3 | 3 × 3 | 3 × 3 |
| number of kernel | 64 | 64 | 64 |
| number of parameters | 576 | 36864 | 576 |
| total number of parameters | | 296064 | |

However, when the noise statistics of an input image deviate significantly from the training conditions, the DnCNN 100C and the DCAD 100D can lead to poor denoising results.

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

Figure 2:
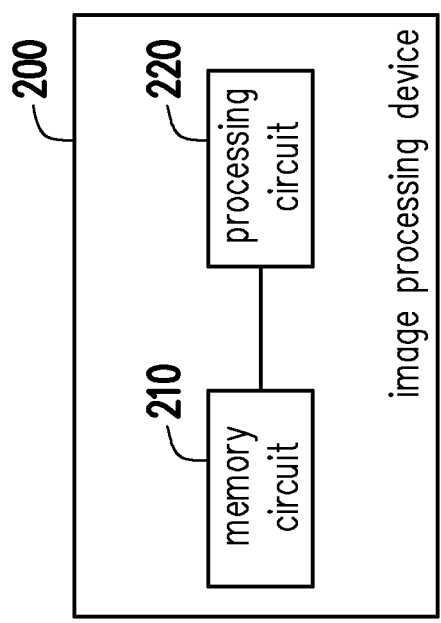
FIG. 2 illustrates a schematic diagram of a proposed image processing device in accordance with one of the exemplary embodiments of the disclosure.

FIG. 2 illustrates a schematic diagram of a proposed image processing device in accordance with one of the exemplary embodiments of the disclosure. All components of the image processing device and their configurations are first introduced in FIG. 2. The functionalities of the components are disclosed in more detail in conjunction with FIG. 3.

Referring to FIG. 2, an image processing device 200 would include a memory circuit 210 and a processing circuit 220 coupled thereto in the present exemplary embodiment. The image processing device 200 may be implemented as an integrated circuit (IC) or a computer system. The memory circuit 210 would be configured to store programming codes, device configurations, data, and so forth and may be implemented using any memory technology. The processing circuit 220 would be configured to implement functional elements of the proposed method in the following exemplary embodiments.

Figure 3:
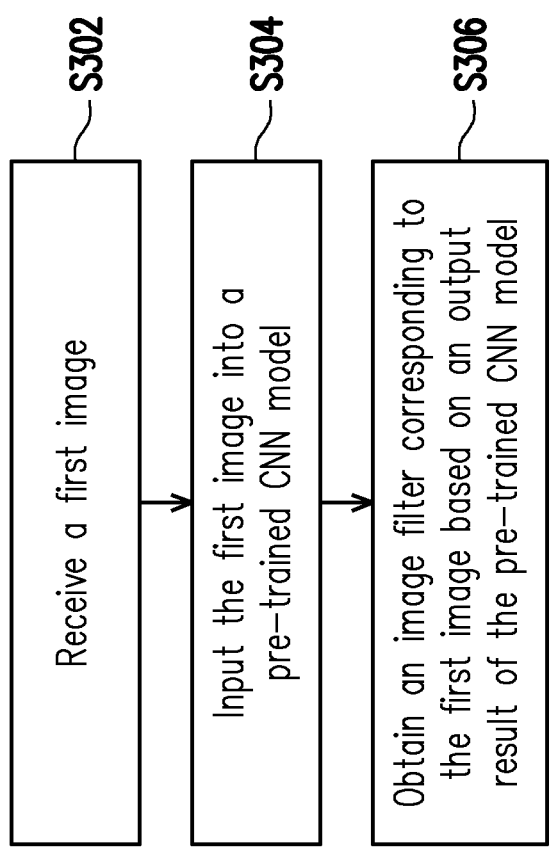
FIG. 3 illustrates a flowchart of a proposed method for generating an image filter in accordance with one of the exemplary embodiments of the disclosure.

FIG. 3 illustrates a flowchart of a proposed method for generating an image filter in accordance with one of the exemplary embodiments of the disclosure. The steps of FIG. 3 could be implemented by the proposed image processing device 200 as illustrated in FIG. 2, where a pre-trained CNN-model would be stored in the memory circuit 210.

Referring to FIG. 3 in conjunction to FIG. 2, the processing circuit 220 of the image processing device 200 would receive a first image (Step S302). Herein, the first image could be an image in any color space, and the first image includes pixels having pixel values such as luminance or intensity as known per se. Next, the processing circuit 120 would input the first image into a pre-trained CNN model (Step S304) and obtain obtaining an image filter corresponding to the first image based on an output result of the pre-trained CNN model (Step S306). Herein, the image filter would be dynamically generated based on the first image. The image filter may be a denoising filter that can remove noise from the first image, an FRC filter that increases the total number of frames in a video sequence including the first image. More details would be provided hereafter.

Figure 4:
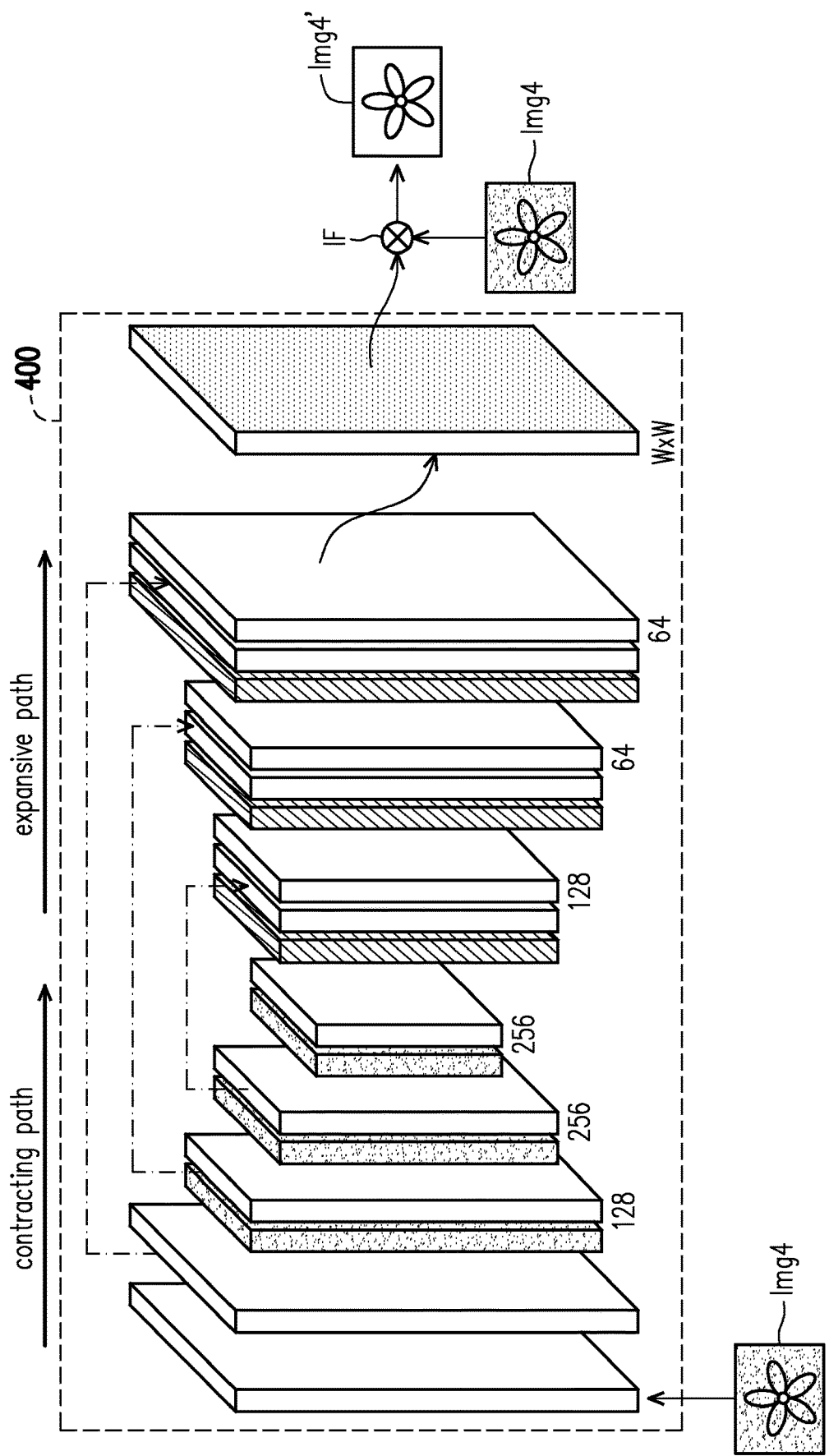
FIG. 4 illustrates a schematic diagram of a proposed image filter with a U-Net architecture in accordance with one of the exemplary embodiments of the disclosure.

FIG. 4 illustrates a schematic diagram of a proposed image filter with a U-Net architecture in accordance with one of the exemplary embodiments of the disclosure.

Referring to FIG. 4, a U-Net convolutional network 400 would be the pre-trained CNN model in the present exemplary embodiment. The U-Net convolutional network 400 would include a contracting path, an expansive path, and at least one skip connection path between the contracting path and the expansive path as known per se. The U-Net would combine location information from the contracting path with contextual information in the expansive path to finally obtain general information combining localization and context.

Once receiving a first image Img4, the processing circuit 220 would split the first image Img4 into multiple color channels (e.g. RGB channels) to generate multiple first split images respectively corresponding to the color channels. Next, the processing circuit 220 would perform convolution for feature extraction and down-sampling for dimension reduction (e.g. max-pooling) on the first split images for multiple layers in the contracting path to generate first down-sampled images. Next, the processing circuit 220 would perform up-sampling and deconvolution on the first down-sampled images in the expansive path to generate up-sampled images. Note that the skip connections intend to provide local information to the global information while up-sampling to provide better fusion of swallow features and deep features.

The processing circuit 220 would generate an output result based on the up-sampled image. Herein, the output result includes multiple weights corresponding to each pixel of the first image, and an image filter IF with a dimension of W×W would be composed of the weights. In other words, each pixel in the first image would have its corresponding image filter with a dimension of W×W (e.g. 3×3). The image filter IF would be used for replacing a conventional in-loop filter in an image encode or an image decoder (e.g. the in-loop filter 114 as illustrated in FIG. 1A). Herein, the image filter IF would receive the first image Img4 and generate a denoise first image Img4'. Note that the image filter IF would not only produce an image with preservation of fine details and removal of artifacts, but would also improve coding efficiency.

It would be understood by a skilled artisan that the pre-trained CNN model would include model parameters trained by training images in the model-training stage. The training images may be noisy images and corresponding ground truth images.

Figure 5:
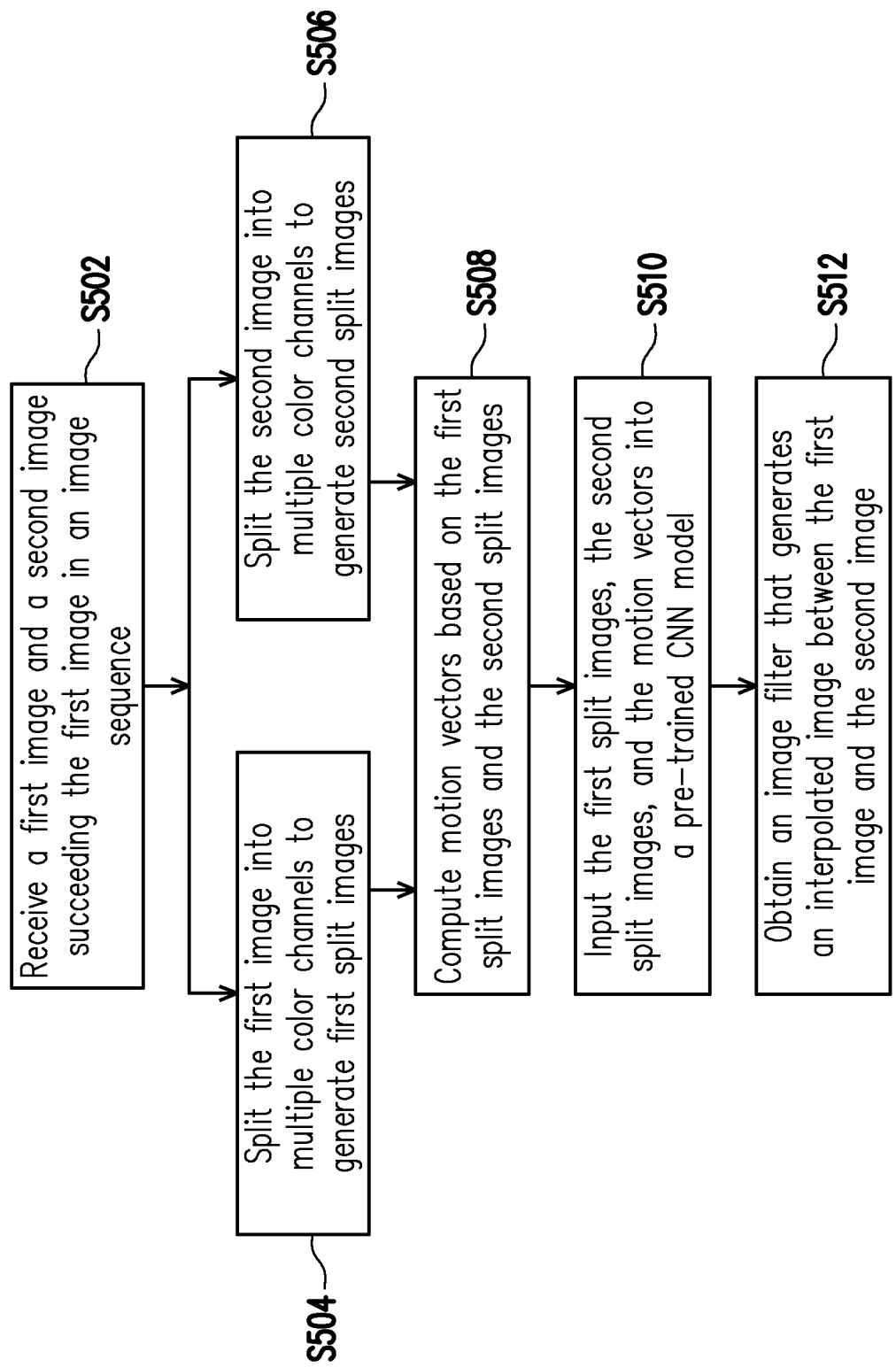
FIG. 5 illustrates a flowchart of a proposed method for generating a frame rate up-conversion (FRC) filter in accordance with one of the exemplary embodiments of the disclosure.

FIG. 5 illustrates a flowchart of a proposed method for generating a frame rate up-conversion (FRC) filter in accordance with one of the exemplary embodiments of the disclosure. The steps of FIG. 5 could be implemented by the proposed image processing device 200 as illustrated in FIG. 2. Note that the FRC algorithm would allow to increase frame rate (fps) of a video stream by inserting the new frames therein.

Referring to FIG. 5 in conjunction to FIG. 2, the processing circuit 220 of the image processing device 200 would receive a first image and a second image succeeding the first image in an image sequence (Step S502).

Next, the processing circuit 120 would split the first image into multiple color channels to generate first split images respectively corresponding to the color channels (Step S504) and split the second image into multiple color channels to generate second split images respectively corresponding to the color channels (Step S506). For example, the first image may be split into three first split images with RGB channels, and the second image may be split into three second split images with RGB channels as well. Next, the processing circuit 120 would compute motion vectors based on the first split images and the second split images (Step S508) and input the first split images, the second split images, and the motion vectors into the pre-trained CNN model (Step S510). The processing circuit 220 would generate an output result corresponding to the first image and the second image based on an output result of the pre-trained CNN model. The processing circuit 120 would then obtain an image filter that generates an interpolated image between the first image and the second image (Step S512).

Note that the output result includes multiple weights corresponding to each pixel of the first image and a corresponding pixel of the second image, and the image filter would be an FRC filter composed of the weights. The image filter would receive the first image and the second image and generate an interpolated image therebetween to achieve between motion continuity and smoothness. Note that the image filter would not only provide high accuracy of motion tracking and compensation, but would also provide constant temporal sharpness level of the frames in converted video stream.

It would be understood by a skilled artisan that the pre-trained CNN model would include model parameters trained by training images in the model-training stage. The training images may be multiple sets of three consecutive images in video streams.

In view of the aforementioned descriptions, the proposed method and image processing device would dynamically generate an image filter for each received image for better visualization quality.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for generating an image filter, comprising:
   receiving a first image;
   receiving a second image succeeding the first image in an image sequence;
   inputting the first image into a pre-trained convolutional neural network (CNN) model, wherein the step of inputting the first image into the pre-trained CNN model comprises:
      splitting the first image into a plurality of color channels to generate a plurality of first split images respectively corresponding to the color channels;
      splitting the second image into the color channels to generate a plurality of second split images respectively corresponding to the color channels;
      computing a plurality of motion vectors based on the first split images and the second split images; and
      inputting the first split images, the second split images, and the motion vectors into the pre-trained CNN model; and
   obtaining the image filter corresponding to the first image based on an output result of the pre-trained CNN model.

2. The method according to claim 1, wherein before the step of receiving the first image, the method further comprises:
   obtaining the pre-trained CNN model comprising a plurality of model parameters trained by a plurality of training images.

3. The method according to claim 1, wherein the pre-trained CNN model has a U-Net architecture comprising a contracting path, an expansive path, and at least a skip connection between the contracting path and the expansive path.

4. The method according to claim 1, wherein the step of inputting the first image into the pre-trained CNN model comprises:
   splitting the first image into a plurality of color channels to generate a plurality of first split images respectively corresponding to the color channels; and
   inputting the first split images into the pre-trained CNN model.

5. The method according to claim 4, wherein the step of obtaining the image filter corresponding to the first split images based on the output result of the pre-trained CNN model further comprises:
   performing convolution and down-sampling on the first split images to generate a plurality of first down-sampled images;
   performing up-sampling and deconvolution on the first down-sampled images to generate a plurality of up-sampled images;
   generating the output result based on the up-sampled image, wherein the output result comprises a plurality of weights corresponding to each pixel of the first image, and wherein the image filter is composed of the plurality of weights.

6. The method according to claim 1, wherein the image filter is used for replacing an in-loop filter in an image encoder or an image decoder.

7. The method according to claim 1, wherein the output result comprises a plurality of weights corresponding to each pixel of the first image and a corresponding pixel of the second image.

8. The method according to claim 1, wherein the image filter generates an interpolated image between the first image and the second image.

9. An image processing device comprising:
   a memory circuit, configured to store a pre-trained convolutional neural network (CNN) model;
   a processing circuit, configured to receive a first image, receive a second image succeeding the first image in an image sequence, input the first image into the pre-trained CNN model, and obtain the image filter corresponding to the first image based on an output result of the pre-trained CNN model,
   wherein the processing circuit splits the first image into a plurality of color channels to generate a plurality of first split images respectively corresponding to the color channels, splits the second image into the color channels to generate a plurality of second split images respectively corresponding to the color channels, computes a plurality of motion vectors based on the first split images and the second split images, and inputs the first split images, the second split images, and the motion vectors into the pre-trained CNN model.

10. The image processing device according to claim 9, wherein the processing circuit obtains the pre-trained CNN model comprising a plurality of model parameters trained by a plurality of training images.

11. The image processing device according to claim 9, wherein the pre-trained CNN model has a U-Net architecture comprising a contracting path, an expansive path, and at least a skip connection between the contracting path and the expansive path.

12. The image processing device according to claim 9, wherein the processing circuit splits the first image into a plurality of color channels to generate a plurality of first split images respectively corresponding to the color channels and inputs the first split images into the pre-trained CNN model.

13. The image processing device according to claim 12, wherein the processing circuit performs convolution and down-sampling on the first split images to generate a plurality of first down-sampled images, performs up-sampling and deconvolution on the first down-sampled images to generate a plurality of up-sampled images, and generates the output result based on the up-sampled images, wherein the output result comprises a plurality of weights corresponding to each pixel of the first image, and wherein the image filter is composed of the plurality of weights.

14. The image processing device according to claim 9, wherein the image filter is used for replacing an in-loop filter in an image encoder or an image decoder.

15. The image processing device according to claim 9, wherein the output result comprises a plurality of weights corresponding to each pixel of the first image and a corresponding pixel of the second image.

16. The image processing device according to claim 9, wherein the image filter generates an interpolated image between the first image and the second image.

* * * * *